United States Patent
Surodin

[11] Patent Number: 6,051,891
[45] Date of Patent: Apr. 18, 2000

[54] SOLAR ENERGY POWER SYSTEM INCLUDING VAPORIZATION TO PRODUCE MOTIVE POWER BY BOUYANCY

[76] Inventor: Eduard G. Surodin, 2630 Kings Bridge Ter. #214, Bronx, N.Y. 10463

[21] Appl. No.: 09/013,734

[22] Filed: Jan. 27, 1998

[30] Foreign Application Priority Data

May 29, 1997 [WO] WIPO ............... PCT/US97/09669

[51] Int. Cl.[7] ............... B60L 1/02; F01K 15/00
[52] U.S. Cl. ............... 290/2; 290/1 R; 290/4 R; 290/93; 290/44; 290/53; 290/54; 290/55
[58] Field of Search ............... 290/1 R, 4 R, 290/43, 44, 53, 54, 55; 60/495, 496, 641

[56] References Cited

U.S. PATENT DOCUMENTS

| | | | |
|---|---|---|---|
| 4,103,493 | 8/1978 | Schoenfelder | 60/641 |
| 4,111,259 | 9/1978 | Lebduska | 237/1 A |
| 4,196,590 | 4/1980 | Fries | 60/496 |
| 4,342,196 | 8/1982 | Yeh | 60/531 |
| 4,363,212 | 12/1982 | Everett | 60/496 |
| 4,462,213 | 7/1984 | Lewis | 60/641.8 |
| 4,498,294 | 2/1985 | Everett | 60/496 |
| 4,538,415 | 9/1985 | Lebecque | 60/639 |
| 4,739,620 | 4/1988 | Pierce | 60/641.8 |
| 5,512,787 | 4/1996 | Dederick | 290/4 R |
| 5,685,147 | 11/1997 | Brassea | 60/496 |

*Primary Examiner*—Elvin Enad
*Attorney, Agent, or Firm*—Michael Bak-Boyohuk

[57] ABSTRACT an electric power generating station characterised by a solar array (1) source of electrical power connected to drive a compressor/condenser liquifier (9, 18) to condense compressed gas to liquid state and cryogenic temperature. The liquified gas is then evaporated in a finned heat exchanger (22) and the gas vapor is then conveyed to cool the compressor motor (9), a generator (55), and thereafter directed to the bottom of a liquid tower (41), subjacent a set of inverted buckets (49) spaced on an endless belt (50) engaged on pulleys (48, 52), all submerged in the tower liquid and one of which is engaged to drive the generator. As the buckets are turned around the upper pulley (52), the gas trapped therein is released and conveyed by a return line (45) back to the condensing-evaporation cycle. The use of a gas cycle liquified at cryogenic temperatures exposes the cooled motors (9, 32) and the cooled generator (55) to temperature at which superconductivity may be achieved.

1 Claim, 1 Drawing Sheet

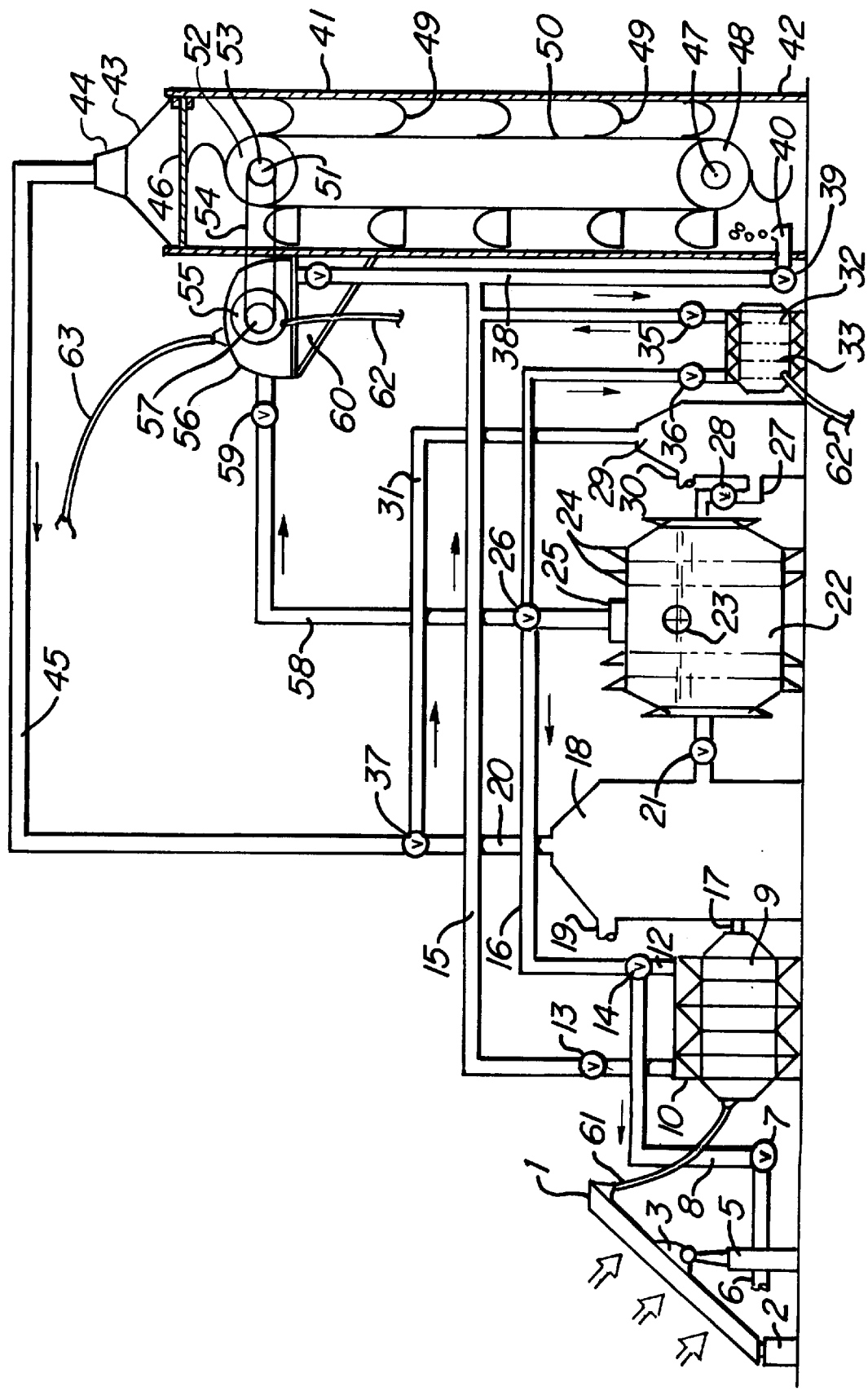

SOLAR ENERGY POWER SYSTEM INCLUDING VAPORIZATION TO PRODUCE MOTIVE POWER BY BOUYANCY

TECHNICAL FIELD

This invention relates to solar powered electrical generators, and more particularly to electrical generators driven by expansion of gas compressed by solar power.

1. Technical Background

Production of electrical power from local conditions like wind, solar energy and the like is highly dependent on the variations in the local state, and various storage techniques have been devised for accumulating the excess energy at one time for use later. While most often electrical energy is stored in a battery, mechanical storage techniques have been implemented, including the energy stored by compressing gas to its liquid state.

2. Description of the Prior Art

The production and storage of electrical power derived from wind has been known in the past. Generators of this type depend on the immediate wind conditions to derive power, and therefore vary in their output as local conditions change. In one example, described in U.S. Pat. No. 3,806,733, a wind driven compressor is used to collect compressed gas in an accumulator which is then used for energy storage. The compressed gas is thereafter released into one or more of inverted buckets on a partly submerged pulley belt, displacing the fluid out of the buckets and thereby producing a buoyancy imbalance useful to drive a generator engaged to the belt. While suitable for the purposes intended, the principal disadvantage of the foregoing arrangement is its lack of effective use except in wide open spaces, exposed to wind. Moreover, a wind driven compressor is rarely driven to its design limits and operates mainly at low efficiency levels that are not effective for compressing gas. Consequently the average power output of the prior art structure is low, further reduced by the losses of the bucket train traversing the liquid surface.

SUMMARY OF THE INVENTION

Accordingly, it is the general purpose and object of the present invention to provide an effective power station capable of generating electric energy at high efficiency and in all geographic regions of the earth.

Other objects of the invention are to provide a locally powered electric generator of an efficiency competitive with large scale thermal power stations.

As is known in the art, various heat driven electric power stations (e.g., fossil fuel power plants, nuclear power plants, and the like) use heat energy to heat and evaporate water, which as high pressure steam then drives rotary turbines. It is also known in the art that conversion of water to steam entails the highest heat coefficients, and large amounts of energy are necessary to produce steam resulting in cost electrical energy.

In accordance with the present invention, a gas of the type liquified at cryogenic temperatures is stored in an externally ribbed storage tank exposed to ambient surroundings. The large latent thermal difference between the liquified gas and the environment is then used to boil the liquified gas, producing a low temperature, high pressure gas stream that is then released into the bottom of a fluid filled tower subjacent a plurality of inverted buckets fixed to a pulley belt. As the pulley belt is driven in rotation by the buoyant lift of the gas filled buckets through the fluid, a generator engaged to the pulley belt produces electrical power. The trapped gas is then released from the buckets as they each are turned over the upper pulley, to collect in the ullage cavity of the upper chamber of the tower for return and re-compression to its liquid state by a solar powered compressor. An auxiliary compressor powered by the partial output of the generator may be used to re-compress the gas at such times when the solar array is ineffective, with the selection determined by computer control.

BRIEF DESCRIPTION OF THE DRAWINGS

The single drawing illustrates in diagrammatic form the operative elements of the inventive electric power station.

DESCRIPTION OF THE PREFERRED EMBODIMENT

The inventive power station is characterized by a solar cell array 1 moveable in azimuth about an axis 2 and in elevation about an axis 3, the elevation alignment being effected by an automatic control elevation or inclination regulator 4 provided with valves 5 and 6 controlling the flow from a high pressure gas line 8. An electric motor 9 for compressing gas to its liquid state is tied by a conduit 61 to the array and is enclosed in a cooling jacket 10 provided with an inlet valve 12 and outlet valve 11 in circuit with gas feed regulators 13 and 14 on the outlet feed pipe 15 and inlet pipe 16 and engaged by a shaft to a gas condenser or liquifier 18. Liquefier 18 is provided with an intake pipe 19 and a return line 20 through which the working gas is returned for liquefaction. The liquified gas, now at cryogenic temperature, is then fed through a valved outlet line 21 to a heat exchanger 22 in the form of a container provided with a liquid level gauge 23 and exterior heat exchange fins or ribs 24, to exchange heat from the ambient surroundings. The evaporated gas produced as a result of this heat exchange is collected at an outlet 25 and fed through a distribution valve 26 back to pipe 16 and other conveyance lines further described.

A liquified gas supplemental feed line 27 also connects to exchanger 22, delivering an auxiliary flow controlled by valve 28 from a supplemental condenser or liquifier 29 powered by an auxiliary compressor motor 32 again cooled by a cooling jacket 33 and extending an output shaft 34 into the liquifier. Jacket 33 receives one of the other outputs from distributor valve 26, across a gas feed pipe 36, returning the gas from the cooling jacket through a gas discharge pipe 35 to the gas flow in pipe or line 15.

The gas flow in pipe 15, mixed with other gas flows described above and to be described, is conveyed by gas feed pipe line 38 and a regulator 39 to a discharge nozzle 40 at the bottom of a tower 41 defined by a base section 42 and an upper section 43. Here the gas is emitted from nozzle 40 into a working fluid filling the tower 41, subjacent a vertical column of inverted buckets or ladles 49 fixed to an endless belt 50 engaged on an upper pulley 52 and a lower pulley 48 mounted for rotation about upper and lower axes 51 and 47 respectively. Tower 41 is filled to substantially its full height, at liquid level 46, and buckets 49, belt 50, and the upper and lower pulleys are therefore fully submerged in the working fluid.

The gas vented from nozzle 40 is therefore trapped in the buckets while they are inverted, lifting that side of the belt loop, to release the trapped gas to collect in the ullage chamber 44 from where it is returned by pipe 45 and valve 37 to !liquifiers 18 and 29. A take-off belt 54 passed around a take-off pulley 53 on pulley 52 and engaged on a drive wheel 57 on a generator 55 drives the generator in rotation, to produce electrical power. Once again, the generator is enclosed in a cooling jacket 56 fed by gas from distributor valve 26 through a feed line 58 and valve 59, with the heat produced in the course of generating electric power then carried off to mix with the gas in pipe 15 to be conveyed to nozzle 40. The electric power thus generated is then conveyed into leads 63 for consumption.

In operation the foregoing structure is rendered operative in accordance with the following description. During the daylight hours sunlight photons illuminate solar array 1 that is fixed to rotary axis. As the sun position changes, the array is automatically adjusted in alignment by regulator 4 attached to the axis 3. The motive power for this control adjustment is derived from the compressed gas, supplied through pipe 8 and valve 5, with the assistance of regulator 7 and electrically operated discharge valve 6.

The electric power from solar array 1, conveyed by line 61, energizes the electric compressor motor 9 tied by its output shaft 17 to the condenser or liquifier 18, and the heat losses in the compressor motor are exchanged to the gas in the cooling jacket 10 provided by an inlet valve 12 and gas regulator 14 to a discharge pipe 15, across discharge valve 11 and regulator 13. Thus as the gas is compressed to its liquid state, at cryogenic temperatures, its subsequent evaporation is assisted by the exchanging the various heat losses. In this evaporate form the gas is returned to the condenser or liquifier 18 by way of feed pipe 20 and supplemented through port 19. The liquified gas then enters, by pipe 21, the heat exchanger cavity 22 that is both finned or ribbed for more effective heat exchange with the ambient surroundings, and is provided with a level sensor to insure proper liquid level.

Within heat exchanger 22 gas evaporates from the cryogenic surface and is fed through outlet 25 and distribution valve 26 to cool the main motor 9, the auxiliary electric motor 32 and the generator 55, thus raising the efficiency of the system. The liquified gas within exchanger 22 is also augmented by the auxiliary condenser or liquifier 29 fed through pipe 27 controlled by regulator 28. Condenser 29 may receive further supplemental gas through port 30, the gas being compressed by motor 32 driving a shaft 34, the motor again being provided with a cooling jacket 33 receiving gas through pipe 36 and discharging it into pipe 35.

Once operation is commenced the augmenting use of motor 32, and the function of condenser 29, are powered by the power output of generator 55, consuming about 10% of its power. In this operating state the gas that is emitted through nozzle 40 into tower 41 carries with it the heat losses exchanged in the cooling jackets, through pipes 15, 35 and 38 at a rate controlled by regulator 39. The gas expansion in the tower, therefore, conserves most of the heat losses of operation.

The tower 41, itself, is generally a cylindrical reservoir defined by a conical upper segment 43 and a base 42, filled substantially to its full height, to the level 46, with fluid. A submerged pivot axle 47 in the lower end of the tower supports pulley 48, with another pivot axle 51 supporting a pulley 52 submerged in the upper part of the tower. An endless belt 50 passes around pulleys 48 and 52, with a plurality of buckets 49 attached in spaced intervals to the belt. Consequently, the buckets 49 are inverted along one pulley side, each forming an inverted cavity to capture the gas emitted from nozzle 40 aligned below this inverted bucket column. The inverted bucket column, each now containing trapped gas, is then lifted by buoyant displacement, and as each bucket is turned around the upper pulley 52 the captured gas is released into the upper segment 43, to be returned for re-compression in condenser 29 through pipe 45. At the same time, torque is produced about axle 51 then transferred by sheave 53 and take-off belt 54 to drive the generator 55 which also includes a cooling jacket 56 conveying gas through pipe 58 and regulator 59 to line 38 and thereafter to nozzle 40.

The generator 55 may be supported on a frame 60 fixed to tower 41 and may be provided wits output cables 62 and 63, respectively connected to the auxiliary compressor motor 32 and to the electric connections of the consumer. Moreover, the solar array 1 may be sized to produce sufficient power during day time to compress in condenser 18 a volume of liquified gas sufficient to sustain the power demands during night time, including the power consumed to operate the secondary condenser 29. In this manner a continuous production of electrical energy is assured, replenished each day by the solar array 1 driving the motor 9 to charge condenser 18. Once charged with cryogenic liquid gas, condenser 18 feeds exchanger or evaporator 22 to produce cold vapor that is distributed by pipe lines 16, 36 and 58 to cool motors 9 and 32 and generator 55.

The gas produced and expanded in the course of cooling the various power devices is then used to provide the motive power to advance the endless belt in rotation. In this manner the thermal losses incident in any power device are used to advantage, expanding the gas for more effective buoyant lift, while at the same time cooling the electrical components of each power device to cryogenic temperatures and the associated reductions in resistance therein. Accordingly, by selecting electrical component material structures in each device that may have superconductive attributes and a gas having a liquid temperature below the superconducting temperature of the material structures, very high power outputs can be realized.

Of course, various control techniques may be applied in the foregoing process, ranging from manual control to that effected by computer controlled systems. Those in the art will appreciate the control convenience and the slow response rates inherent in the foregoing teachings, and well known control techniques may therefore be applied.

What is claimed is:

1. In an electric power generating station comprising a power source for compressing gas, a storage tank for storing said compressed gas, a tower partly filled with fluid including a vertical endless belt looped around pulleys and attached in spaced attachments to a plurality of buckets deployed to align the inverted ones thereof above a port communicating with said primary condenser, the improvement comprising:

said power source includes a solar cell array conveying electric power to an electric motor connected to a primary condenser for converting said compressed gas to liquid state, said motor including a first cooling jacket formed around the exterior thereof:

an evaporator provided with external heat exchange ribs connected to receive said liquified gas from said primary condenser for converting said liquified gas to gas;

a generator connected for rotation to a selected one of said pulleys and including a second cooling jacket around the exterior thereof;

a secondary condenser connected to said evaporator and driven by an auxiliary electrical motor connected for electrical excitation to said generator, said auxiliary motor including a third cooling jacket formed around the exterior thereof;

conveying means connected from said evaporator, through said first, second and third cooling jackets to said port for conveying said gas therebetween; and wherein said tower is hermetically sealed and connected at the upper end thereof by a distributing manifold to said primary and secondary condensers and said pulleys being submerged below the surface of said fluid and said tower comprises a closed cavity communicating through said port with said conveying means.

\* \* \* \* \*